E. A. BEAMER.
DRINKING TROUGH.
APPLICATION FILED APR. 25, 1921.

1,403,731.

Patented Jan. 17, 1922.
2 SHEETS—SHEET 1.

Inventor
E. A. Beamer,
By
Attorneys

E. A. BEAMER.
DRINKING TROUGH.
APPLICATION FILED APR. 25, 1921.
1,403,731.
Patented Jan. 17, 1922.
2 SHEETS—SHEET 2.
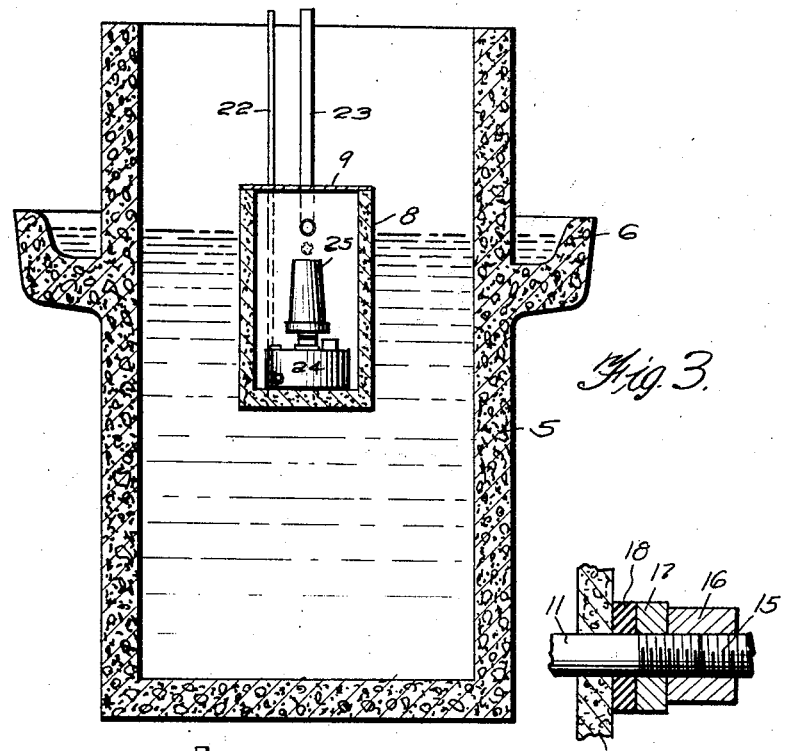
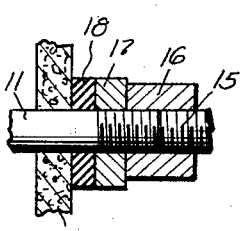
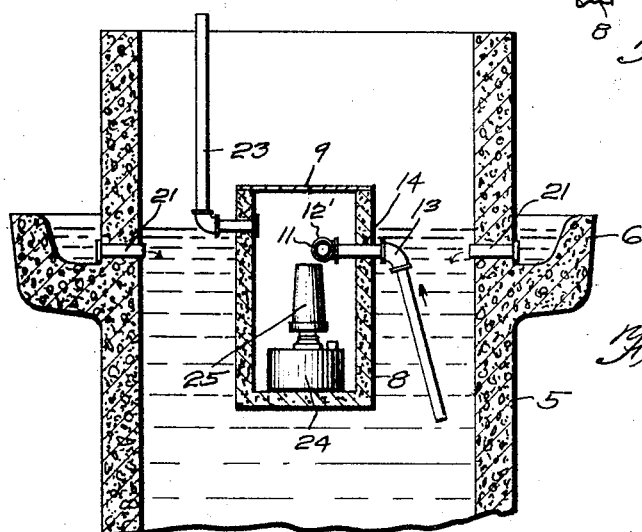
Inventor
E. A. Beamer,

UNITED STATES PATENT OFFICE.

EARL A. BEAMER, OF ANCHOR, ILLINOIS.

DRINKING TROUGH.

1,403,731.  Specification of Letters Patent.  Patented Jan. 17, 1922.

Application filed April 25, 1921. Serial No. 464,082.

*To all whom it may concern:*

Be it known that EARL A. BEAMER, a citizen of the United States, residing at Anchor, in the county of McLean and State of Illinois, has invented certain new and useful Improvements in Drinking Troughs, of which the following is a specification.

My invention relates to improvements in animal drinking troughs.

An important object of the invention is to provide a heating element arranged within the tank surrounded by the trough and supplying the water thereto, such heating element heating the water and effecting a proper circulation, for preventing freezing and maintaining it at a suitable temperature for the animals, such heating element also having means to supply air to the lamp or burner, and to discharge the products of combustion therefrom, without creating an undue draft.

A further object of the invention is to so arrange the parts that the water circulating pipes serve to support the heating element, disposed within the tank of the device.

A further object of the invention is to provide a device of the above mentioned character, which is of simple construction, and may be readily installed in place with its parts assembled.

Other objects and advantages of the invention will be apparent during the course of the following description.

In the accompanying drawings forming a part of this specification, and in which like numerals are employed to designate like parts throughout the same, Fig. 1 is a plan view of a drinking apparatus embodying my invention, Fig. 2 is a side elevation of the same.

Fig. 3 is a transverse section taken on line 3—3 of Fig. 1,

Fig. 4 is a similar view taken on line 4—4 of Fig. 1, parts broken away.

Fig. 5 is a detail section through a coupling, embodied in the invention.

Figure 1:
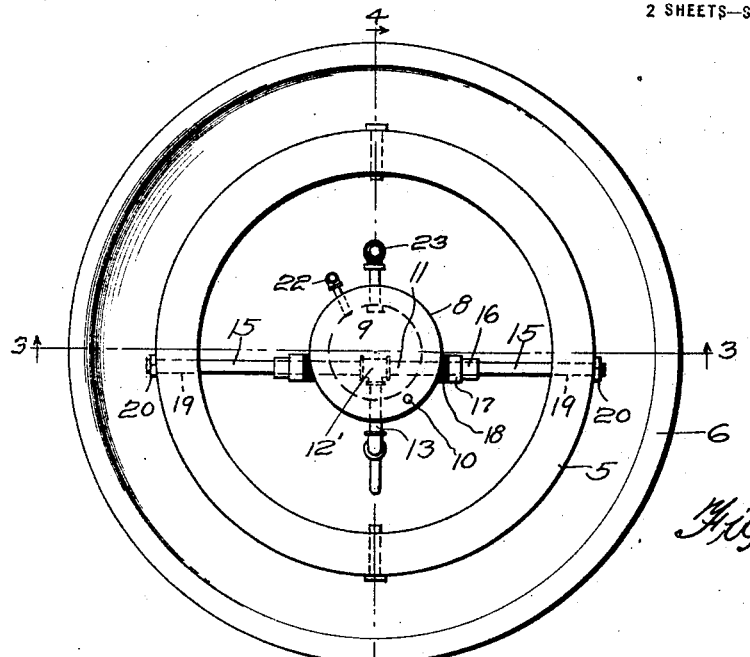
Figure 2:
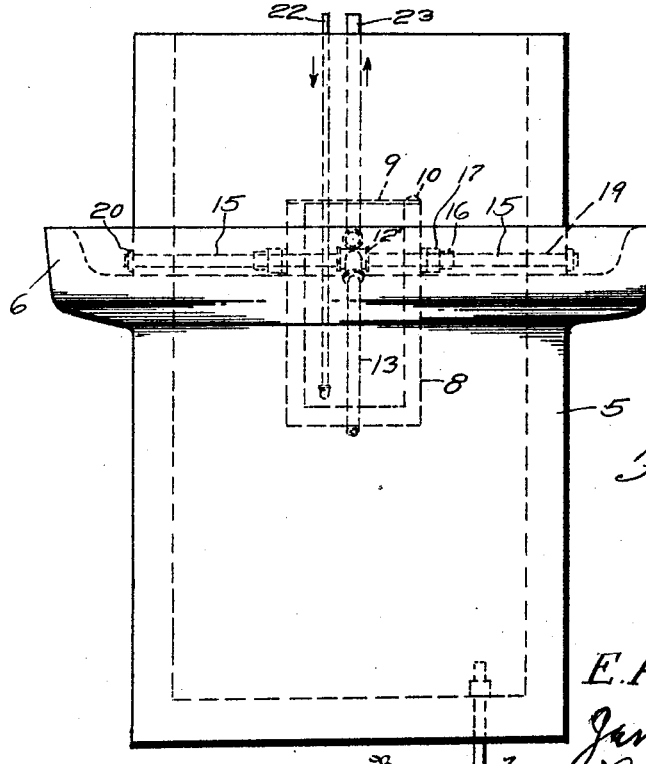

In the drawings, wherein for the purpose of illustration is shown a preferred embodiment of my invention, the numeral 5 designates a water holding tank, preferably formed of concrete, which may be suitably reinforced, and preferably cylindrical. Surrounding the upper portion of the tank 5, in concentric relation thereto is a trough 6, preferably formed integral with the tank. The tank has its lower portion buried in the earth, the trough 6 being arranged at the surface of the earth, so that animals, such as hogs, may readily drink from the same. Water is supplied into the tank 5 through a pipe 7, preferably leading into the bottom thereof, to prevent freezing of the water in this pipe.

The heating element embodies a casing or receptacle 8, preferably formed of concrete. This receptacle has its bottom closed and its top open, the open top being covered by a preferably flat lid 9, pivoted upon a bolt 10, to swing horizontally. The receptacle 8 is disposed concentrically within the tank 5, near the annular trough, 6, and the top of this receptacle extends above the top of the trough 6, and therefore above the maximum water level in the tank.

Pipes 11 extend through openings 12 in the sides of the receptacle 9 and project therebeyond. The inner ends of these pipes are connected with a T coupling 12', connected with the inner end of a water inlet pipe 13, extending through an opening 14 in the side of the receptacle, and preferably arranged at a right angle to the openings 12. The outer portion of the water inlet pipe 13 is preferably angularly arranged, as shown. Pipes 15 are disposed in end to end relation with the pipes 11, and are connected therewith by couplings 16, having screw threaded engagement therewith. Washers 17 are arranged inwardly of the couplings 16, and packing rings 18, of rubber or the like are confined between the washers 17 and receptacle 8, for effecting a tight joint. The ends of the pipes 15 extend through openings 19, in the tank 5, and outwardly beyond the tank. These ends are screw threaded, for receiving clamping nuts 20, which serve to bind the pipes 15 to the tank, against turning movement upon their longitudinal axes. The pipes 15 constitute the sole support for the receptacle 8, and hold the same stationary against accidental displacement.

Water return pipes 21 lead from the trough 6 to the interior of the tank 5, as shown in Fig. 4.

The numeral 22 designates a vertical air inlet pipe, arranged interiorly of the tank 5, and having its discharge end leading into the lower end of the receptacle 8. A gas or discharge pipe 23 leads into the upper portion of the receptacle 8, as shown. The air supply pipe 22 is preferably of a smaller diameter than the outlet pipe 23, thereby controlling the inlet of air to the receptacle 8, and preventing undue draft.

In operation, a lamp 24 or other burner is arranged within the receptacle 8, and the chimney 25 of the lamp is preferably arranged near and beneath the coupling 12, so that the maximum degree of heat is applied to the coupling. The water within this coupling and the pipes 11 being heated, flows outwardly, and discharges through pipes 15 into the annular trough 6. Water is fed upwardly and inwardly through the pipe 13. As the water cools in the trough it returns to the tank 5 through the pipes 21. The products of combustion escape through the pipe 23 and fresh air is supplied into the receptacle 8 through the pipe 22.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having thus described my invention, I claim:

1. In drinking apparatus of the character described, a tank, a trough surrounding the tank and having openings for connecting the same with the tank, a receptacle arranged within the tank and having openings in its sides, a water circulating pipe extending through said openings and through said tank into said trough, said water circulating pipe serving to support the receptacle from said tank, a water inlet pipe leading into the water circulating pipe, and a heating element within the receptacle beneath the water circulating pipe.

2. In drinking apparatus of the character described, a tank, a trough surrounding the tank and having openings for connecting the same with the tank, a receptacle arranged within the tank and having openings in its sides, a coupling within the receptacle, water circulating pipes connected with the coupling and extending through said tank and leading into said trough, said circulating pipes serving to support the receptacle from the tank, a water inlet pipe leading into said receptacle and connected with said coupling, and a heating element disposed within said receptacle.

3. In drinking apparatus of the character described, a tank, a trough carried by the tank and having opening means connecting the same with the tank, a receptacle in the tank, water circulating means leading into the receptacle and discharging into the trough and serving to support the receptacle from said tank, a lamp within the receptacle, and air circulating means connected with said receptacle.

In testimony whereof I affix my signature.

EARL A. BEAMER.